United States Patent
Gabel

(10) Patent No.: US 8,472,417 B2
(45) Date of Patent: Jun. 25, 2013

(54) COMMUNICATION CONTROL METHOD

(75) Inventor: Oliver Gabel, Reichenbach-Steegen (DE)

(73) Assignee: Mobotix AG, Winnweiler (DE)

( * ) Notice: Subject to any disclaimer, the term of this patent is extended or adjusted under 35 U.S.C. 154(b) by 342 days.

(21) Appl. No.: 12/679,817

(22) PCT Filed: Sep. 3, 2008

(86) PCT No.: PCT/DE2008/001472
§ 371 (c)(1),
(2), (4) Date: Jul. 6, 2010

(87) PCT Pub. No.: WO2009/039818
PCT Pub. Date: Apr. 2, 2009

(65) Prior Publication Data
US 2010/0290443 A1    Nov. 18, 2010

(30) Foreign Application Priority Data
Sep. 25, 2007 (DE) .......................... 10 2007 045 894

(51) Int. Cl.
*H04W 4/00* (2009.01)
(52) U.S. Cl.
USPC ........ 370/338; 455/403; 455/422.1; 455/436; 455/440; 340/932.2; 340/988; 340/989; 340/990; 340/991; 701/400; 701/408
(58) Field of Classification Search
USPC ............... 370/331–334; 455/403, 422.1, 436, 455/440; 340/932.2, 988–996; 701/400–541
See application file for complete search history.

(56) References Cited

U.S. PATENT DOCUMENTS

| 6,252,544 | B1 | 6/2001 | Hoffberg | |
|---|---|---|---|---|
| 6,429,812 | B1 | 8/2002 | Hoffberg | |
| 6,791,472 | B1 | 9/2004 | Hoffberg | |
| 7,268,700 | B1 * | 9/2007 | Hoffberg | 340/905 |
| 2004/0008253 | A1 | 1/2004 | Monroe | |
| 2004/0162109 | A1 | 8/2004 | Shimoda et al. | |
| 2005/0013264 | A1 * | 1/2005 | Sundberg | 370/328 |
| 2007/0130599 | A1 | 6/2007 | Monroe | |
| 2007/0142050 | A1 * | 6/2007 | Handforth et al. | 455/436 |
| 2007/0155360 | A1 | 7/2007 | An | |
| 2007/0185646 | A1 | 8/2007 | Neugebauer et al. | |
| 2008/0032726 | A1 * | 2/2008 | Tajima et al. | 455/509 |

FOREIGN PATENT DOCUMENTS

| DE | 10 2005 022 762 | 11/2006 |
|---|---|---|
| EP | 1 818 873 | 8/2007 |
| JP | 2005-117150 | 4/2005 |
| JP | 2005-303804 | 10/2005 |
| JP | 2005-341254 | 12/2005 |
| JP | 2006-308472 | 11/2006 |

* cited by examiner

*Primary Examiner* — Charles C Jiang
(74) *Attorney, Agent, or Firm* — Oblon, Spivak, McClelland, Maier & Neustadt, L.L.P.

(57) ABSTRACT

The invention relates to a method for controlling communication between at least one stationary and at least one mobile, data-exchanging unit. In said method, a position of the mobile unit is determined, and communication is made possible in response thereto. According to the invention, a priority measure is determined in response to the determined position, and data can be transmitted from the mobile, data-exchanging unit according to the priority.

12 Claims, 1 Drawing Sheet

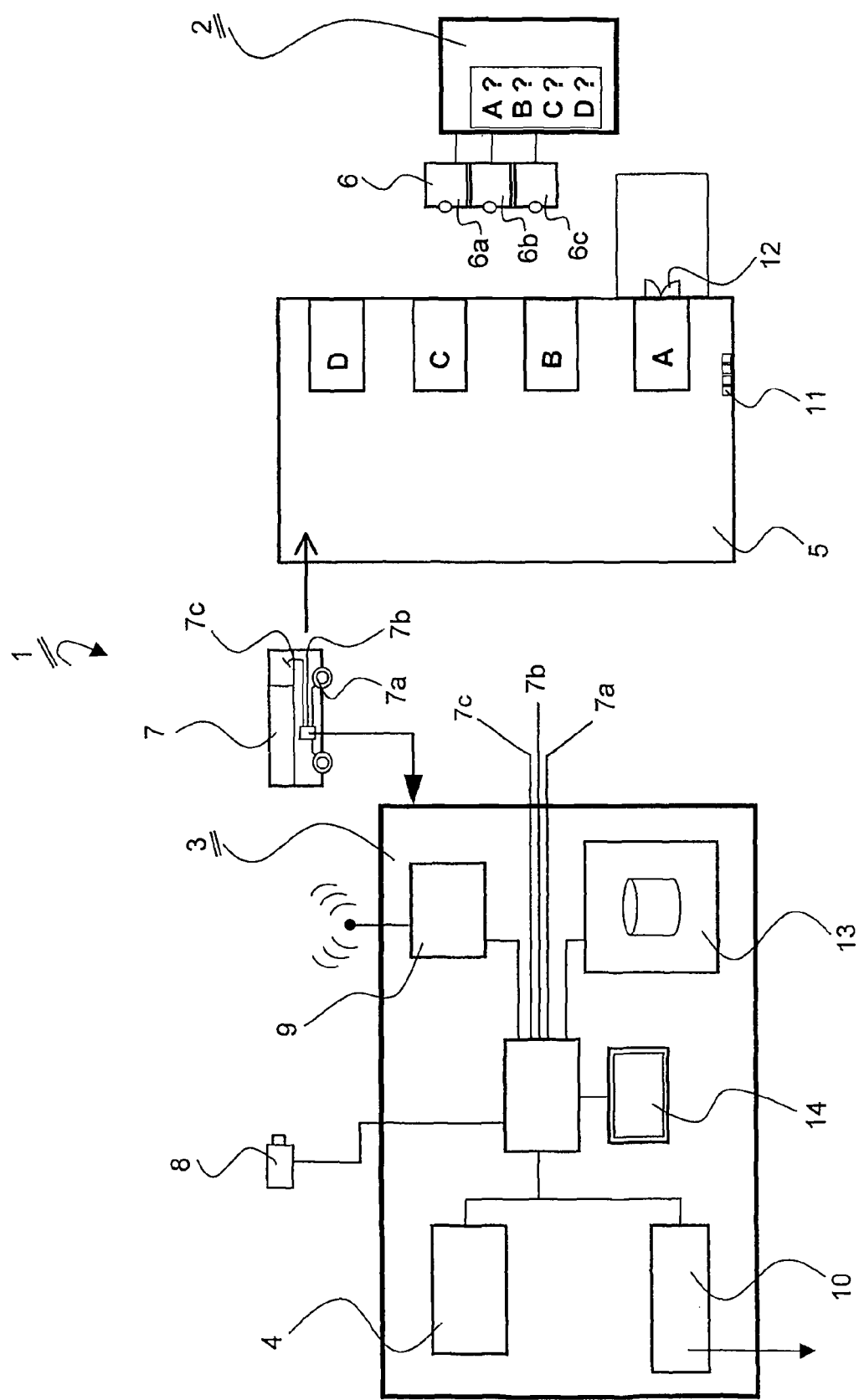

COMMUNICATION CONTROL METHOD

The present invention relates to the matter claimed in the preamble and thus relates to the communication between data-exchanging units.

There is a multiplicity of applications in which data-exchanging units have to communicate with one another. In this context, one of the units is often mobile whilst the other one is stationary. This applies, for example, to laptops which must be connected to changing WLAN networks, for instance at a workplace, on the one hand, and in the private residential area, on the other hand; however, this also applies, for example, to transport vehicles which acquire data during a trip and then have to transmit the data to a fixed point such as a terminal. In this context, it is desirable that data are transmitted exclusively if the mobile unit is in the vicinity of a correct stationary unit. This ensures, on the one hand, that the possibility of an unauthorized access to the mobile data unit is reduced which increases data security. On the other hand, the power consumption of a mobile unit is possibly reduced just because it does not have to be operated continuously to the full extent.

From DE 10 2005 022 762, a communication terminal is known which has a memory which stores, for at least one WLAN communication network, the geographic positions at which a WLAN communication network is available, and the WLAN radio module of which is activated for setting up a radio communication link between the WLAN radio module and a WLAN communication network when it is determined on the basis of the current geographic position that a WLAN communication network is available. It is specified that the geographic position can be determined by receiving and correspondingly processing GPS (Global Positioning System) signals or by using other systems for determining position. It is also specified that the communication terminal, after checking its geographic position, should check by means of the information available in the memory where the WLAN communication network is available and activates the WLAN radio module only in the case where a WLAN communication network is available and starts an attempt to set up a radio communication link to the WLAN communication network.

From DE 203 10 113 U1, an arrangement is known which relates to WLAN and UMTS systems and deals with the handover process between a UMTS system and a WLAN system.

From WO 2005/022937 A1, a method for improving the WLAN handover behavior at entry/exit points is known.

The problem in the case of complex systems is frequently that a multiplicity of communication attempts must be dealt with using only a limited bandwidth. It is desirable to be able to improve a communication between a stationary unit and at least one mobile data-exchanging unit even in the case of complex systems. The systems can be particularly complex due to the presence of a multiplicity of mobile data-exchanging units and/or due to a multiplicity of stationary units but the aim is still an optimization of the communication behavior.

The object of the present invention consists in providing novel matter for the commercial application.

The achievement of this object is claimed in independent form. Preferred embodiments are found in the sub-claims.

A first basic concept of the present invention can thus be seen in the proposal that, in a method for controlling communication between at least one stationary unit and at least one mobile data-exchanging unit it is provided that a position of the mobile unit is determined and communication is made possible in response thereto, wherein a priority measure is determined in response to the position determined and data can be transmitted from the mobile data-exchanging unit according to the priority.

A basic concept of the present invention thus lies in the finding that even the position determined can be sufficient by itself for not only permitting or rejecting a data transmission per se but, moreover, for controlling it according to priority.

For instance, when a certain position is reached, it is possible to determine whether a transmission is currently also desired by other units in order to then appropriately adapt the data transmission. This does not occur on the basis of the determination of a given bandwidth which is available and is divided more or less uniformly between transmitter and receiver as in conventional networks but conversely it is queried whether there are other units which also wish to or are intended to transmit and a deliberate prioritization is carried out among these units. This makes sense, for example, if several mobile units are intended to transmit data from passenger-carrying railroad wagons to a fixed unit in a railroad station in order to provide this data for maintenance purposes etc. Initially, it can be detected that the train has entered a railroad station, that is to say the position of the mobile unit in the train is determined. In response to the railroad station being reached, a communication is then made possible in order to transmit the data to a central station or the like. In the case of long trains, when large amounts of data have been produced in the individual wagons, this cannot be done completely for all wagons during only a brief stay at the railroad station. For this reason, for example, initially only a brief information item which specifies the number of the wagon and a priority measure for the data transmission, generated by the wagon itself, is transmitted from all railroad wagons ready for transmission to a central unit. Thus, a priority can be set to be low by the transmitting wagon itself if no special events have occurred, it can be set to a medium priority measure if slight maintenance work is required, for example refilling wash water for toilet installations, and can be set to be very high if data indicate that a malfunction has occurred, e.g. in brakes, which possibly significantly disturbs or endangers the train operation.

Incidentally, this presupposes a priority assessment of individual events in the mobile units which is possible and preferred here, the prioritization also including the filling level of a data memory, the age of data etc.

The central unit to which the wagon code numbers and the current priority measure are initially transmitted can then block the transmission for all wagons except those having the highest priority so that the critical data are transmitted immediately whereas less critical data are held back. If the stay in a railroad station then lasts long enough so that all data could be transmitted completely from the corresponding wagon, the wagon can be informed by the central processing unit and/or the wagon can inform the central station that the data transmission is ended, its priority is reset, the wagon will set a marker so that only the data additionally accrued in the meantime have to be transmitted at a next stop which data can again be provided with a new priority measure and if necessary, the transmission of highly prioritized data from other wagons can begin. It should be pointed out that in such a case the data from a wagon which have already been transmitted do not need to be deleted but preferably remain available in the wagon in order to have all data locally available immediately for example in the case of greater maintenance work in a central station.

If, in contrast, the railroad station stay was so short that a transmission had to be interrupted before the train has started to move again, a marker can be set in the corresponding wagon regarding which data have already been transmitted and the transmission of data can be continued in the next railroad station, possibly after a corresponding competition in accordance with the principle of priority described. Incidentally, individual highly prioritized data, for example those pointing to brake defects can also be prioritized in turn during the transmission so that possibly no complete data record is transmitted even if this is preferred. It is therefore reasonably possible to call up successive wagons several times in order to retrieve particularly highly prioritized information first from all wagons, e.g. in order to determine all information items about defective brakes as quickly as possible even if such deflects occur in different wagons.

Another application consists in bus depots, that is to say large central bus stations in cities and the like where the buses are stored at night and maintenance work takes place. If data are collected in the buses both about the vehicles and about the volume of passengers, these can be transmitted by radio to a central processing unit without intervention from the outside, according to the invention. The bandwidth required for a simultaneous transmission from all buses cannot be achieved, however. In order to then reduce the power consumption for the transmission of data, on the one hand, and to ensure, on the other hand, that all data are correctly transmitted, a short-term communication to a stationary central station in the bus station can be set up, for example, at the moment at which a bus drives into the bus station which can be detected via a corresponding unit by means of its position, in order to interrogate whether other buses are also waiting for data transmission. Incidentally, it could be queried in the same manner whether another bus is already transmitting or just waiting for a possibility to transmit. If this is not the case, the data transmission can begin immediately. Otherwise, it is possible to negotiate between the mobile data-exchanging unit in the bus by means of which vehicle and passenger data have been collected, and the central processing unit in the bus station as to how significant the transmission of data is currently for the individual bus. The priority can be set to be particularly high if there are so many buses in the depot that a transmission is not considered daily and the memory in the vehicle has already almost reached its maximum storage capacity, that is to say data have to be overwritten for future recordings.

The data transmission can also be placed very highly if it is absolutely necessary that the bus is maintained due to defects and another bus would have to be used instead of it on the following day before it is used further.

A high priority can also be set if, for example, the interior of the vehicle has been monitored with one or more cameras and during at least one trip, irregularities such as attacks or the like have occurred which require an immediate access to the image data. This can be signaled by automatic image analysis or preferably manually. In the case of manual prioritization, for example by the driver, additional information, for example about engine noises etc., can preferably also be recorded. If no factors increasing the priority are given, the priority for the data transmission can simply be determined in accordance with which buses have arrived before the respective vehicle and the transmission is then deferred until the vehicles with higher priority have been interrogated. In this manner, the full bandwidth is in each case available to the individual bus for the data transmission without there having to be any further communication management.

It can also be provided that, if necessary, there is a channel splitting of the overall transmission channels, for instance if very important data have to be transmitted by two buses whilst the transmission from other vehicles can still wait.

In principle, data transmission will only be able to take place with a limited data transmission rate.

The transmission rate is typically limited because the channels which are available for the transmission are limited with regard to the transmission bandwidth.

It is particularly preferred if a multiplicity of stationary units are provided with which an individual mobile unit can communicate. This is the case, for instance, if the stationary units are arranged in railroad stations. The stationary units, in turn, can then again communicate with a central processing unit and it will be reasonable that the bandwidth limitation is typically bandwidth-limited due to the transmission between mobile and stationary unit and not due to the transmission between stationary unit and central processing unit.

The mobile unit can be arranged on a means of passenger transport whereas the stationary units are arranged at typical stopping points. This can be the case, on the one hand, as explained by way of example, in rail traffic where stationary units are provided at railroad stations; this can also be the case at stopping points, particularly terminal stops, in the case of buses, or at taxi stands etc. Incidentally, however, although a bus station was mentioned above into which several buses will enter, analogous applications are naturally possible for example in freight companies etc.

A particularly preferred application is security van services since the acquisition of the geographic position already has a special significance in these. The position can be determined in several stages, especially here but also in other applications. For example, the position of a vehicle or of a mobile unit can initially be determined roughly, for example, by a GPS (Global Positioning System). If the GPS data indicate that a vehicle is in the vicinity of its depot or of a railroad station, it is possible to determine by means of another detection process whether the vehicle at the position determined roughly by GPS has already been driven into a predetermined position, for example whether a train has reached its stop position in the railroad station or a bus is already standing at a predetermined parking space in the depot. This check can be made in a different manner from the determination of the GPS signal, for example visually by scanning and detecting certain markers, by magnetic induction etc.

It is particularly preferred if at least one position determination is carried out in such a manner that the position can be falsified only with difficulty which is obviously the case with GPS data. To obtain even greater security here, it is also desirable to record the history of the position and, if necessary, to release a transmission easily only if the position at which the transmission was intended to take place has been reached via a particular path. This can be reasonably provided even without previous failure of the position determination. However, it is particularly preferred at least when the data are to be particularly protected against unauthorized interrogation and it must be feared that a vehicle or the mobile unit located therein is deceived with wrong positions. In such a case, it is no longer sufficient to feed in only the correct end position for the data transmission but, instead, a plausible path must be specified which is significantly more difficult since such a path does not need to be known especially even when it would be known to a third party who wishes to access data in an authorized manner that a correct position must be reached for the release of a data transmission.

Incidentally, it is possible to perform a prioritization in such a manner that a particular transmission period, for example a period of a beginning of transmission—which may be possible—is predetermined. This can be advantageous, for instance in the example of a bus depot mentioned as introduction, because, when many vehicles are already in the depot, the transmission of which will take some time, intermediate enquiries whether a transmission is possible in the meantime, are not even continuously required. This is because the unit in a bus arriving later can be switched off completely for a not inconsiderably long period.

Incidentally, it is possible additionally to carry out a further position determination even after a rough position has been reached. Depending on where the mobile unit is precisely located in the region in which a data transmission per se is considered at all, it is then possible to specify the data rate with which it is intended to transmit by means of the more precise position determination. Thus, an increased transmission can be permitted, for example when a bus is driven directly over a workshop pit whilst buses parked closely by the workshop pit deliver data gradually at the same time. This aids in the maintenance of a vehicle having a clearly recognized defect. The further position determination can take place, for example, optically, by induction loop or the like.

Corresponding procedures are possible also for armored car services in which valuables must be placed in a safe which is typically possible only from a single place whereas parked security vans are parked close to this transfer point for the next use.

In the text which follows, the invention will be shown only by way of example by means of the drawing, in which FIG. 1 shows a system for controlling communication between a mobile unit located at a vehicle and a stationary data-exchanging unit located in a vehicle depot.

According to FIG. 1, a system generally designated by 1 comprises at least one stationary data-exchanging unit 2 and one mobile data-exchanging unit 3, a means 4 for determining the position of the mobile unit being provided and the arrangement being intended and constructed for the purpose that initially a position of the mobile unit is determined and communication is made position in response thereto, in such a manner that in response to the position determined, a priority measure is determined and the data transmission from the mobile data-exchanging unit 3 is made possible according to priority as will be explained in the text which follows.

In the exemplary embodiment shown, the arrangement 1 is an arrangement by means of which a multiplicity of vehicles 7 can be parked in parking spaces A, B, C, D in a vehicle depot 5 at which the stationary data-exchanging unit 2 is provided, each of the vehicles carrying a mobile data-exchanging unit 3.

In the exemplary embodiment shown, the stationary data-exchanging unit 2 is represented by a central server to which a multiplicity of transmission means 6, in this case several WLAN radio receivers 6a, 6b, 6c for different frequencies are allocated which are constructed and arranged in such a manner that data from vehicles which are parked in the parking spaces A, B, C, D in the vehicle depot 5 can be received. The transmission means 6, implemented here as WLAN transmitters, can be operated in such a manner that either all channels of the individual devices 6a, 6b, 6c are grouped for the transmission from a single vehicle 7 or a transmission can take place simultaneously from several vehicles; an only partial grouping, for instance only of the channels of devices 6a, 6b can also be possible. The use of other transmission means such as Bluetooth etc. is reasonably possible and shall be mentioned for the sake of completeness.

In a particularly preferred embodiment, the arrangement of the radio transmission systems 6a, 6b, 6c is such that a grouped transmission by means of many, preferably all wireless transmission units 6a, 6b, 6c at the highest data rate is possible at least when a vehicle 7 is parked in the parking space A in the vehicle depot. Nevertheless, these units should be distributed in such a manner that the entire vehicle depot, that is to say each individual parking space A, B, C, D is covered.

Incidentally, it is clear that neither the number of transmitting units 6a, 6b, 6c connected to the stationary data-exchanging unit 2 is actually restricted to three nor does the vehicle depot need to be equipped for only four parking spaces. Instead, it must be realized that this restriction only exists for reasons for better clarity.

The stationary data-exchanging unit 2 has in its server a means 2a via which the communication between vehicles 7 entering the vehicle depot 5 and the stationary data-exchanging unit 2 can be controlled, independently of a priority which is allocated to a respective vehicle as will be explained. This means 2a can be implemented as part of a communication program.

The mobile data-exchanging unit 3 is mounted at the vehicles 7 in such a manner that initially vehicle data, for example from the engine, from the tachometer and from the wheels are picked up and stored in order to obtain, on the one hand, information about the route and the traveling along it, for instance with regard to the average speed, intermediate stops etc. This is illustrated by lines 7a, 7b, 7c which run to the engine, to the wheels and to the control system in the exemplary embodiment shown, where corresponding sensors and signal conditioning devices can be provided which do not need to be discussed in further detail since they do not represent the major subject matter of the present invention.

The mobile data-exchanging unit 3 is also connected to one or more cameras 8 at the vehicle in order to receive images form there. The camera 8 can provide different images, for example of the interior of the vehicle, of the driver cabin, of all four sides of the vehicle etc. These images can be compressed in a conventional manner; thus, it is possible to store only changes between images of a camera and/or also to store additionally information which helps to build up the images as rapidly as possible when jumping to an arbitrary point in a datastream. Corresponding applications have already been filed by the applicant of the present application and reference is made to these for purposes of disclosure.

Furthermore, the mobile, data-exchanging unit 3 has a unit 4 for acquiring GPS signals as means 4 for determining the position of the mobile data-exchanging unit. Furthermore, a data transmission means 9 for the wireless data transmission from the mobile data-exchanging unit 3 is provided, the data transmission unit 9 being constructed for exchanging data with the units 6 in the vehicle depot 5 or, respectively, units formed in the same manner, that is to say communicating via an identical protocol. It should be mentioned that the data transmission units 9 and/or 6 can be multi-protocol-capable.

The mobile data-exchanging unit 3 is also provided with a means for optical pattern recognition 10 which is implemented here as a bar code reader that can otherwise also be implemented, for example, as an additional camera, especially with the cameras 8 already described. This pattern recognition means 10 is used for recognizing an optical marking 11 in the vehicle depot which indicates that the vehicle 7 is parked directly in the parking space A, in a position where it can be unloaded into a secure space through doors 12.

The mobile data-exchanging unit 3 also has a storage means 13 in which data collected during a trip of the vehicle 7 can be stored until a transmission is allowed.

Furthermore, a priority detection means 14 is provided in the mobile data-exchanging unit 3 which means, in particular, detects whether certain events justify that a transmission of data of the mobile data-exchanging unit 3 to the stationary unit 2 takes place with high priority when the vehicle depot 5 is reached. In the present text, it should only be mentioned by way of example that such justification reasons for increasing the priority of the data transmission are: the presence of vehicle defects, the considerable deviation from a specified route which has previously been specified and which was monitored during the trip with the unit 4 for determining the position, movements which were detected with the camera 8 in the loading space of the vehicle 7 during the trip or failures of the position determination 4.

The prioritization unit 14 is also capable of determining not only priority-related information itself by means of events in the vehicle 7 but also of obtaining a priority measure from the stationary data-exchanging unit 2 and of controlling a data transmission via the data transmission unit 9 in response to a negotiated priority 14.

The arrangement is used as follows:

A vehicle 7 is intended initially to begin a trip from the depot 5 with an empty data memory 13. The data collected during the trip from the means for determining the positions of the mobile data-exchanging unit 3 assumed during the trip, that is to say data about the route traveled, from images from the camera 8 and from the vehicle sensors which are connected to the line 7, are acquired and stored during the trip.

During the acquisition, it is determined at the same time whether certain events are particularly noteworthy, for example because deviations from the traveling route, unplanned intermediate stops etc. have been carried out. This can be done by evaluating the GPS signals from means 4 for determining the position of the mobile unit and by acquiring and evaluating the vehicle sensors 7, and by analyzing images from the interior of the vehicle, for example when a loading space, only loaded per se but not occupied by persons during the trip shows extensive movements.

The data are stored, together with the prioritization information performed by the prioritization stage 14 in the memory 13. It should be pointed out that the prioritization stage can be carried out by a software program and, for the rest, is not mandatorily required but rather a prioritization can also be carried out instead and/or additionally in the central station, for instance on the basis of considerable delays of a vehicle.

As soon as the vehicle 7 approaches the vehicle depot 5, in the ideal case when it is entering the vehicle depot 5, the means for determining the position of the mobile unit will establish that the vehicle 7 has reached a position where data should be transmitted. It should be pointed out that several specified positions can be predetermined, for instance when the vehicle 7 can be stationed in different depots which is easily the case with international freight companies and the like.

When it is recognized that the vehicle 7 has approached the vehicle depot 5, the data transmission 9 of the mobile unit 3 is activated and a vehicle identification is transmitted to the central server together with information about whether highly prioritized, particularly significant data, which must be transmitted rapidly and completely, have been detected during the trip of the vehicle 7. At the same time, the vehicle can be parked in one of the equivalent parking spaces B, C, D. The server 2a of the stationary unit 2 then decides by means of the information transmitted from the vehicle 7 and possibly by means of information about other vehicles already located in the depot whether a data transmission is to take place immediately, whether individual data from the vehicle 7 must be transmitted immediately or whether a particular order in comparison with other vehicles can be maintained and determined. Thus, a prioritization of the transmission of data from the mobile unit 3 of the newly added vehicle 7 is carried out.

The corresponding decision about the prioritization is electronically reported to the mobile unit 3 in the vehicle 7, for example in the form of an expected period of time until the predicted beginning of a transmission. The mobile unit 3 in the vehicle 7 can enter into a stand-by or sleep mode until the predicted time or the predicted beginning of transmission is reached. When the assumed beginning of the transmission has come, the mobile unit can activate itself by means of an internal time control and interrogate regularly whether the data transmissions with higher priority have already taken place and thus its own data transmission can begin. It should be pointed out that such a stand-by or sleep mode circuit is not mandatorily required and can be implemented especially for cases in which relatively long waiting periods until the beginning of a data transmission can be expected.

If, in contrast, the vehicle 7 must be unloaded, for example because there are valuables in the vehicle 7 which must be brought into a safe in the space behind the doors 12, the driver of the vehicle 7 will approach the parking space A. During this process, a pattern 11 in the vehicle depot close to the parking space A will be recognized with the means for optical pattern recognition so that it is recognized in the vehicle in the mobile unit 3 due to this additional more precise determination of the position, in this case with regard to the parking space actually assumed, that together with the unloading, an immediate transmission of data from the mobile unit of the vehicle 7 parked in the parking space A is also desired. This is reported to the server 2 which thus recognizes that a highly prioritized data transmission is required, thereupon, if necessary, interrupts data transmissions already running or reduces their bandwidth and at the same time begins with the transmission of data of the vehicle 7 parked in the parking space A.

The invention claimed is:

1. A method for controlling secure communication between at least one stationary unit and at least one mobile unit, wherein the at least one stationary unit and the at least one mobile unit exchange data, the method comprising:
   determining a position of the mobile unit;
   enabling communication in response to the determined position;
   determining a priority measure in response to the determined position; and
   enabling data transmission from the mobile unit according to the priority measure, wherein
   determining the position of the mobile unit includes determining the position of the mobile unit in several stages,
   determining the position of the mobile unit includes using a satellite-based method of position determination with high security, and
   a history of positions of the mobile unit is recorded and the data transmission is enabled only if a position where the data transmission takes place has been reached via a given path.

2. The method as claimed in claim 1, wherein the data are transmitted with a limited transmission rate.

3. The method as claimed in claim 1, wherein the transmission takes place via bandwidth-limited channels.

4. The method as claimed in claim 1, wherein the mobile unit passes a multiplicity of stationary units and the stationary units communicate with a central processing unit.

5. The method as claimed in claim 1, wherein the mobile unit is arranged on a means of passenger transport and the several stationary units are arranged at stopping points.

6. The method as claimed in claim 1, wherein the mobile unit is arranged on a bus or a train.

7. The method as claimed in claim 1, wherein the mobile unit includes a security van.

8. The method as claimed in claim 7, wherein the security van includes an armored car.

9. The method as claimed in claim 1, wherein determining the position of the mobile unit includes using a method with increased protection against forgery.

10. The method as claimed in claim 1, wherein the history of positions is recorded after a position determination failure.

11. The method as claimed in claim 1, wherein the satellite-based method of position determination method includes determination by means of GPS.

12. The method as claimed in claim 1, wherein determining the priority measure includes determining at least one of a transmission period, a point in time, and a transmission bandwidth.

* * * * *